United States Patent
Han et al.

(10) Patent No.: US 12,008,267 B2
(45) Date of Patent: Jun. 11, 2024

(54) STORAGE MANAGEMENT SYSTEM AND METHOD

(71) Applicant: EMC IP Holding Company, LLC, Hopkinton, MA (US)

(72) Inventors: Geng Han, Beijing (CN); Vamsi Vankamamidi, Hopkinton, MA (US); Jian Gao, Beijing (CN); Sihang Xia, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 8 days.

(21) Appl. No.: 17/724,938

(22) Filed: Apr. 20, 2022

(65) Prior Publication Data

US 2023/0342080 A1    Oct. 26, 2023

(51) Int. Cl.
G06F 12/00      (2006.01)
G06F 3/06       (2006.01)

(52) U.S. Cl.
CPC .......... G06F 3/0659 (2013.01); G06F 3/0619 (2013.01); G06F 3/0634 (2013.01); G06F 3/067 (2013.01); G06F 3/0683 (2013.01)

(58) Field of Classification Search
None
See application file for complete search history.

(56) References Cited

U.S. PATENT DOCUMENTS

2015/0248247 A1* 9/2015 Andrews ............... G06F 3/0634
                                                   711/103
2016/0342476 A1* 11/2016 Nazari ................. G06F 11/1008

* cited by examiner

Primary Examiner — Daniel D Tsui
(74) Attorney, Agent, or Firm — Brian J. Colandreo; Heath M. Sargeant; Holland & Knight LLP

(57) ABSTRACT

A method, computer program product, and computing system for defining one or more user data portions and at least two reserved portions of a solid-state drive (SSD). An operating mode of the SSD may be determined. One or more of the at least two reserved portions of the SSD may be utilized based upon, at least in part, the operating mode of the SSD.

11 Claims, 4 Drawing Sheets

STORAGE MANAGEMENT SYSTEM AND METHOD

BACKGROUND

Storing and safeguarding electronic content may be beneficial in modern business and elsewhere. Accordingly, various methodologies may be employed to protect and distribute such electronic content.

For example, when processing data using a solid-state drive (SSD) in a storage system, the SSD may experience various conditions or modes which may require or utilize particular storage processing functions (e.g., recovering from a data corruption event, resolving a drive failure, etc.). However, these storage processing functions may require storage space from the SSD. While storage space may be dedicated for these storage processing functions, this may result in lower storage capacity for user data and/or may result in wasted storage capacity when relatively transient storage processing functions are not required while occupying the dedicated storage capacity.

SUMMARY OF DISCLOSURE

In one example implementation, a computer-implemented method executed on a computing device may include, but is not limited to, defining one or more user data portions and at least two reserved portions of a solid-state drive (SSD). An operating mode of the SSD may be determined. One or more of the at least two reserved portions of the SSD may be utilized based upon, at least in part, the operating mode of the SSD.

One or more of the following example features may be included. The at least two reserved portions of the SSD may include a predefined over-provision portion and a predefined spare rebuild portion. Determining an operating mode of the SSD may include one or more of: determining that the SSD is in normal mode; determining that the SSD is in degraded mode; and determining that the SSD is in recovery mode. Utilizing one or more of the at least two reserved portions of the SSD based upon, at least in part, the operating mode of the SSD may include one or more of: utilizing one or more of the at least two reserved portions of the SSD for a file system consistency check (FSCK) tier; and utilizing one or more of the at least two reserved portions of the SSD for a caching tier. Utilizing one or more of the at least two reserved portions of the SSD for the FSCK tier may include one or more of: utilizing at least a portion of the predefined over-provision portion for the FSCK tier in response to determining that the SSD is in recovery mode; and utilizing at least a portion of the predefined spare rebuild portion for the FSCK tier in response to determining that the SSD is in recovery mode. Utilizing one or more of the at least two reserved portions of the SSD for the caching tier may include utilizing at least a portion of the predefined spare rebuild portion for the caching tier in response to determining that the SSD is in normal mode. Utilizing one or more of the at least two reserved portions of the SSD for the caching tier may include utilizing at least a portion of the predefined over-provision portion for the caching tier in response to determining that the SSD is in degraded mode.

In another example implementation, a computer program product resides on a computer readable medium that has a plurality of instructions stored on it. When executed by a processor, the instructions cause the processor to perform operations that may include, but are not limited to, defining one or more user data portions and at least two reserved portions of a solid-state drive (SSD). An operating mode of the SSD may be determined. One or more of the at least two reserved portions of the SSD may be utilized based upon, at least in part, the operating mode of the SSD.

One or more of the following example features may be included. The at least two reserved portions of the SSD may include a predefined over-provision portion and a predefined spare rebuild portion. Determining an operating mode of the SSD may include one or more of: determining that the SSD is in normal mode; determining that the SSD is in degraded mode; and determining that the SSD is in recovery mode. Utilizing one or more of the at least two reserved portions of the SSD based upon, at least in part, the operating mode of the SSD may include one or more of: utilizing one or more of the at least two reserved portions of the SSD for a file system consistency check (FSCK) tier; and utilizing one or more of the at least two reserved portions of the SSD for a caching tier. Utilizing one or more of the at least two reserved portions of the SSD for the FSCK tier may include one or more of: utilizing at least a portion of the predefined over-provision portion for the FSCK tier in response to determining that the SSD is in recovery mode; and utilizing at least a portion of the predefined spare rebuild portion for the FSCK tier in response to determining that the SSD is in recovery mode. Utilizing one or more of the at least two reserved portions of the SSD for the caching tier may include utilizing at least a portion of the predefined spare rebuild portion for the caching tier in response to determining that the SSD is in normal mode. Utilizing one or more of the at least two reserved portions of the SSD for the caching tier may include utilizing at least a portion of the predefined over-provision portion for the caching tier in response to determining that the SSD is in degraded mode.

In another example implementation, a computing system includes at least one processor and at least one memory architecture coupled with the at least one processor, wherein the at least one processor configured to define one or more user data portions and at least two reserved portions of a solid-state drive (SSD). An operating mode of the SSD may be determined. One or more of the at least two reserved portions of the SSD may be utilized based upon, at least in part, the operating mode of the SSD.

One or more of the following example features may be included. The at least two reserved portions of the SSD may include a predefined over-provision portion and a predefined spare rebuild portion. Determining an operating mode of the SSD may include one or more of: determining that the SSD is in normal mode; determining that the SSD is in degraded mode; and determining that the SSD is in recovery mode. Utilizing one or more of the at least two reserved portions of the SSD based upon, at least in part, the operating mode of the SSD may include one or more of: utilizing one or more of the at least two reserved portions of the SSD for a file system consistency check (FSCK) tier; and utilizing one or more of the at least two reserved portions of the SSD for a caching tier. Utilizing one or more of the at least two reserved portions of the SSD for the FSCK tier may include one or more of: utilizing at least a portion of the predefined over-provision portion for the FSCK tier in response to determining that the SSD is in recovery mode; and utilizing at least a portion of the predefined spare rebuild portion for the FSCK tier in response to determining that the SSD is in recovery mode. Utilizing one or more of the at least two reserved portions of the SSD for the caching tier may include utilizing at least a portion of the predefined spare rebuild portion for the caching tier in response to determining that the SSD is in normal mode. Utilizing one or more of the at least two reserved portions of the SSD for the caching tier may include utilizing at least a portion of the predefined over-provision portion for the caching tier in response to determining that the SSD is in degraded mode.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
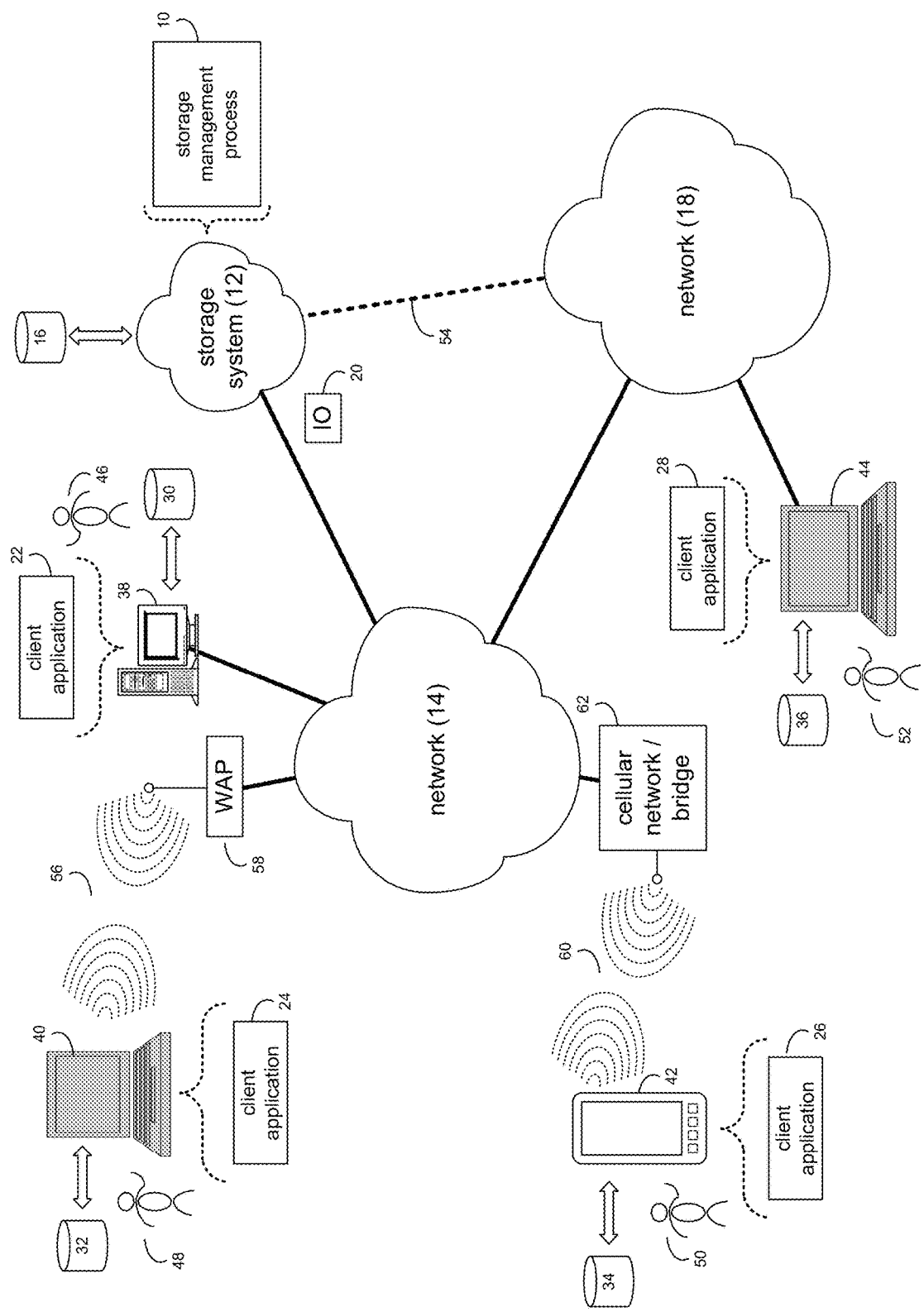
FIG. 1 is an example diagrammatic view of a storage system and a storage management process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage management process, such as storage management process 10 of FIG. 1, may include but is not limited to, defining one or more user data portions and at least two reserved portions of a solid-state drive (SSD). An operating mode of the SSD may be determined. One or more of the at least two reserved portions of the SSD may be utilized based upon, at least in part, the operating mode of the SSD.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
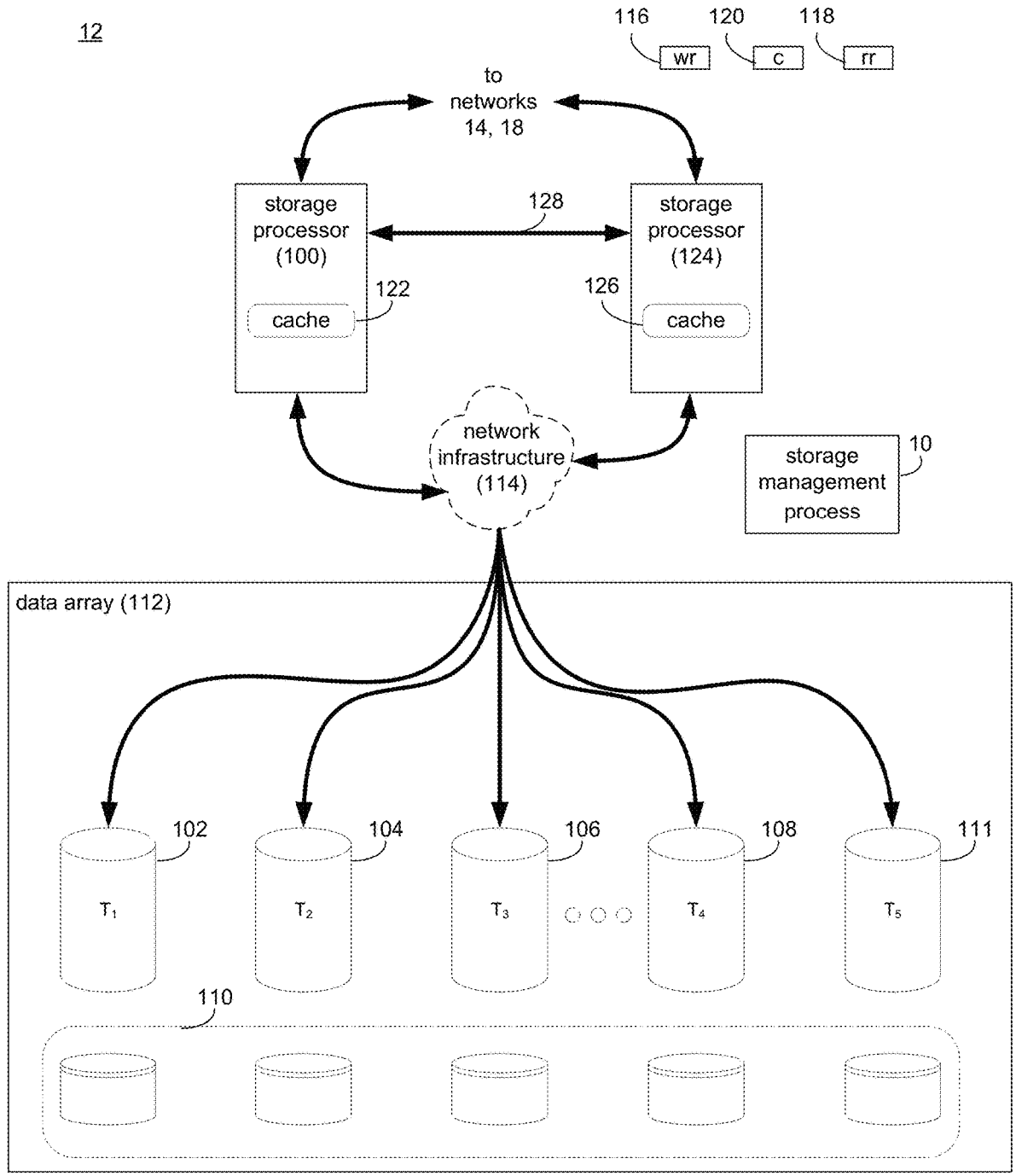
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

Figure 3:
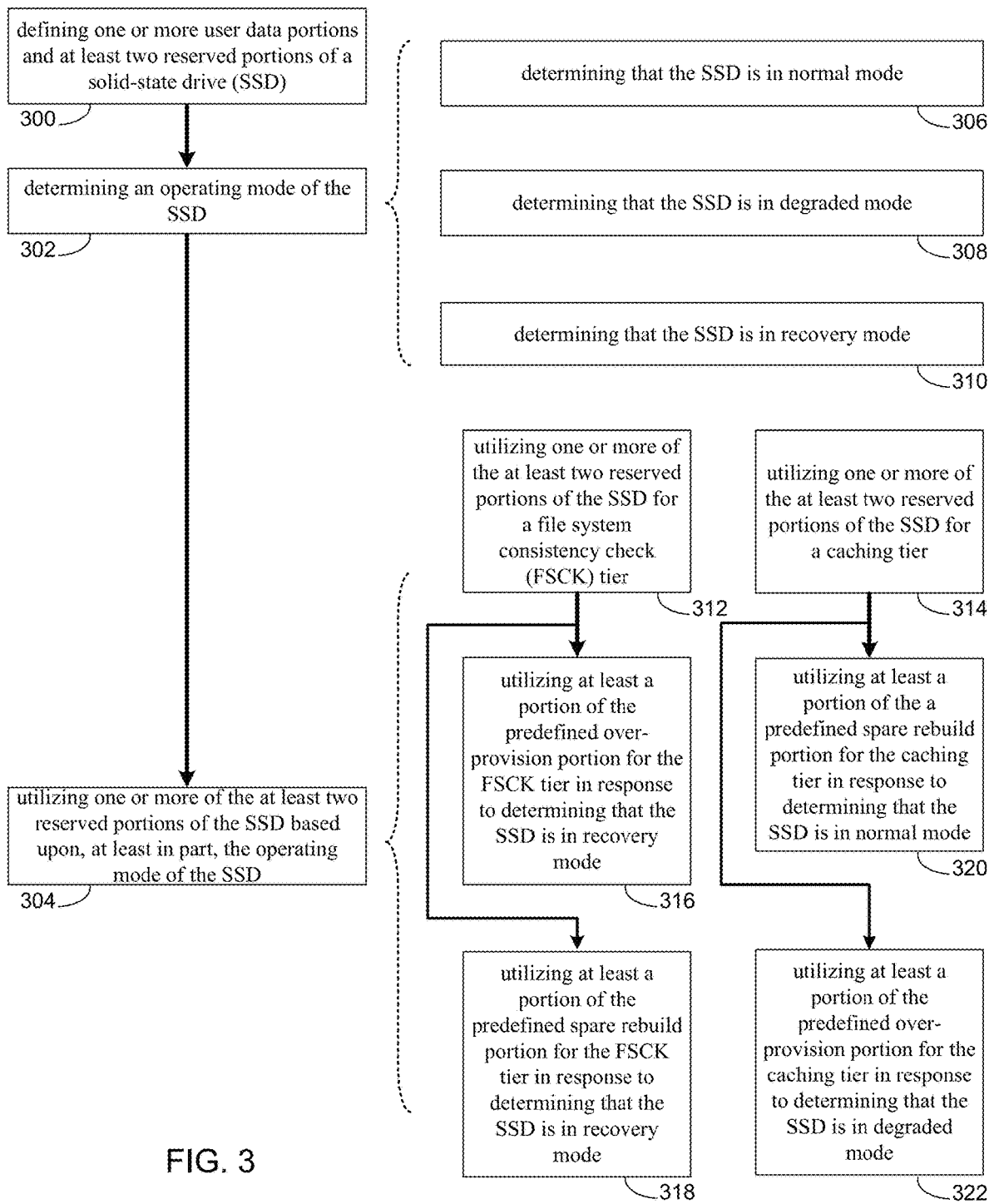
FIG. 3 is an example flowchart of storage management process according to one or more example implementations of the disclosure.
Figure 4:
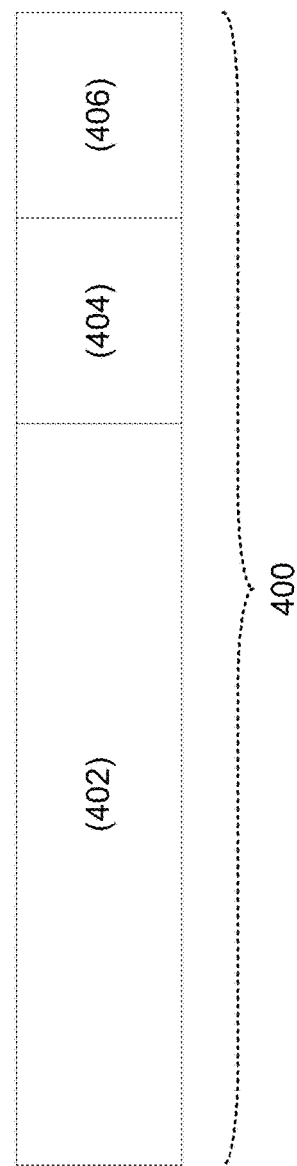
FIG. 4 is an example diagrammatic view of a solid-state drive (SSD) of FIG. 1 according to one or more example implementations of the disclosure.

The Storage Management Process:

Referring also to the examples of FIGS. 3-4 and in some implementations, storage management process 10 may define 300 one or more user data portions and at least two reserved portions of a solid-state drive (SSD). An operating mode of the SSD may be determined 302. One or more of the at least two reserved portions of the SSD may be utilized 304 based upon, at least in part, the operating mode of the SSD.

As will be discussed in greater detail below, storage management process 10 may allow for conventionally reserved portions of a solid-state drive (SSD) to be utilized for particular storage processing functions during transient operating states of the SSD. For example, when processing data using a SSD in a storage system, the SSD may experience various conditions or modes which may require or utilize particular storage processing functions (e.g., recovering from a data corruption event, resolving a drive failure, etc.). However, these storage processing functions may require storage space from the SSD. While storage space may be dedicated for these storage processing functions, this may result in lower storage capacity for user data and/or may result in wasted storage capacity when relatively transient storage processing functions are not required while occupying the dedicated storage capacity.

As will be discussed in greater detail below, implementations of the present disclosure may allow for the sharing of reserved spaces in time division to improve the SSD usage efficiency. In this manner, storage management process 10 may avoid the inefficiencies associated with dedicating storage capacity of SSDs while providing storage capacity for particular storage processing functions (e.g., a file system consistency check tier, a caching tier, etc.) from reserved portions of the SSD's capacity.

In some implementations, storage management process 10 may define 300 one or more user data portions and at least two reserved portions of a solid-state drive (SSD). For example, each SSD may include a total storage capacity. Referring also to FIG. 4, a SSD (e.g., SSD 102) may include a total storage capacity (e.g., total storage capacity 400). Total storage capacity 400 may be any value within the scope of the present disclosure. In some implementations, SSD 102 may include various capacities or portions that are available for user data. For example, SSD may include one or more user data portions that are available for storing user data. In some implementations, the one or more user data portions may include one or more "slices" or fixed-size chunks of the total storage capacity. The one or more user data portions are represented in FIG. 4 as user data portion 402. However, it will be appreciated that SSD 102 may include any number of user data portions within the scope of the present disclosure. As will be discussed in greater detail below, storage management process 10 may limit the user data storage capacity of SSD 102 to a predefined amount or proportion of total storage capacity 400. For example, SSD may include at least two reserved portions that are not provided for storing user data. As such, storage management process 10 may provide, to a customer of SSD, the user data portion 402's capacity as the total available storage capacity of SSD 102. In this manner, storage management process 10 may generally prevent a storage system from storing user data within the at least two reserved portions.

In some implementations, the at least two reserved portions of the SSD may include a predefined over-provision portion and a predefined spare rebuild portion. A predefined over-provision portion may generally include a predefined amount of storage capacity from the total storage capacity that is defined by the SSD manufacturer and is configured to allow the SSD to address extra write operations, the controller firmware, failed block replacements, and other unique features that vary by SSD controller manufacturer. As is known in the art, an SSD's performance begins to decline after it reaches about 50% full. Accordingly, some manufacturers reduce the amount of capacity available to the user for user data and set it aside as additional over-provisioning. For example, an SSD manufacturer may reserve e.g., 28 gigabytes (GB) out of e.g., 128 GB and market the resulting configuration as a 100 GB SSD with 28% over-provisioning. In some implementations, the capacity of the predefined over-provision portion may be based upon, at least in part, the performance of the SSD. For example, the capacity of the predefined over-provision portion may be defined to allow the SSD to withstand at least 3% writes per day (WPD). As shown in FIG. 4, SSD 102 may include a predefined over-provision portion (e.g., predefined over-provision portion 404).

The at least two reserved portions of the SSD may include a predefined spare rebuild portion. A predefined spare rebuild portion may generally include a predefined amount of storage capacity from the total storage capacity that is reserved for RAID rebuilding purposes. For example, during a drive or disk failure, one or more SSDs may operate in a degraded mode such that the failed drive is being rebuilt onto a "hot spare". As is known in the art, a rebuild operation is a computationally intensive operation that requires significant amounts of storage capacity to rebuild a failed drive or disk onto a spare SSD. The predefined spare rebuild portion may be a user-defined capacity, a default capacity, and/or may be defined automatically by storage system 12 or storage management process 10. As shown in FIG. 4, SSD 102 may include a predefined spare rebuild portion (e.g., predefined spare rebuild portion 406).

In some implementations, storage management process 10 may determine 302 an operating mode of the SSD. For example, each SSD may include various predefined operating states that are defined by the SSD and/or by the storage system interfacing with the SSD that define the capabilities of and/or issues experienced by the SSD. Storage management process 10 may query the SSD for its operating mode. In some implementations, the operating mode may be determined when attempting to access the SSD. Storage management process 10 may maintain a log or data structure of SSD operating modes that may be accessed periodically. While several examples have been provided to describe how storage management process 10 may determine 302 the operation mode of the SSD, it will be appreciated that these are for example purposes only and that storage management process 10 may utilize other known approaches to determine the operating mode of the SSD within the scope of the present disclosure.

Determining 302 an operating mode of the SSD may include one or more of: determining 306 that the SSD is in normal mode; determining 308 that the SSD is in degraded mode; and determining 310 that the SSD is in recovery mode. For example, a normal mode may generally indicate the SSD is able to store new data and access stored data normally. A degraded mode may generally indicate that one or more SSDs have failed and are being rebuilt (e.g., a RAID across various SSDs or SSD slices is being rebuilt). A SSD may stay in degraded mode until the failed SSD is replaced. A recovery mode may generally indicate that a SSD has experienced data corruption (e.g., metadata corruption) and is being recovered. The SSD may switch back to normal mode when the data consistency is recovered. While three example operating modes have been described, it will be appreciated that other operating modes may be determined for the SSD within the scope of the present disclosure.

In some implementations, storage management process 10 may utilize 304 one or more of the at least two reserved portions of the SSD based upon, at least in part, the operating mode of the SSD. For example and as discussed above, the at least two reserved portions (e.g., predefined over-provision portion 404 and predefined spare rebuild portion 406) may generally not be used for user data. However, in response to particular operating modes of the SSD, storage management process 10 may utilize one or more of the at least two reserved portions of the SSD to perform particular storage processing functions on the SSD.

For example, utilizing 304 one or more of the at least two reserved portions of the SSD based upon, at least in part, the operating mode of the SSD may include one or more of: utilizing 312 one or more of the at least two reserved portions of the SSD for a file system consistency check (FSCK) tier; and utilizing 314 one or more of the at least two reserved portions of the SSD for a caching tier. As is known in the art, a file system consistency check (FSCK) generally includes checking the consistency of a file system. If inconsistencies are found, FSCK may include interactively repairing damaged file systems (e.g., where the user decides how to fix specific problems), automatically deciding how to fix specific problems (so the user does not have to answer any questions), or reviewing the problems that need to be resolved on a file system without actually fixing them.

Partially recovered files where the original file name cannot be reconstructed are typically recovered to a "lost+ found" directory that is stored at the root of the file system. To allow for FSCK, storage management process 10 may utilize one or more of the at least two reserved portions to define an FSCK tier to address data corruption in the SSD. An FSCK tier may generally include an amount of SSD storage capacity used for resolving data consistency issues. The amount of SSD storage capacity for the FSCK tier may be a user-defined amount, a default amount, and/or may be defined automatically by storage management process 10.

In some implementations, storage management process 10 may utilize 314 one or more of the at least two reserved portions of the SSD for a caching tier. A caching tier may generally include a portion of SSD storage capacity used to cache data from one or more hard disk drives (HDDs). For example, when storage system 12 uses both SSDs and HDDs, storage management process 10 may improve the read and write performance of the HDDs by caching certain data from the HDDs within the SSDs. In this manner, storage management process 10 may provide responses to data stored in the HDDs more quickly using the SSDs than if the data was processed from the HDDs. In some implementations, the caching tier may include an amount of SSD storage capacity used to store HDD data for caching. The amount of SSD storage capacity for the caching tier may be a user-defined amount, a default amount, and/or may be defined automatically by storage management process 10.

Utilizing 312 one or more of the at least two reserved portions of the SSD for the FSCK tier may include one or more of: utilizing 316 at least a portion of the predefined over-provision portion as an FSCK tier in response to determining that the SSD is in recovery mode; and utilizing 318 at least a portion of the predefined spare rebuild portion as an FSCK tier in response to determining that the SSD is in recovery mode. For example, the FSCK tier may be used to address data corruption events. As such, storage management process 10 need not dedicate any space for this tier. When a SSD and/or a storage system enters into recovery mode, storage management process 10 may utilize at least a portion of the predefined over-provision portion. In some implementations, storage management process 10 may utilize at least a portion of both the predefined spare rebuild portion and the predefined over-provision capacity for the FSCK tier. In one example, suppose each SSD has a 20% overprovisioned capacity (e.g., to allow for 1 writes per day (WPD) to 3 WPD). The minimum over-provision capacity may be at least 3% of the overall SSD physical capacity. This may satisfy the 2.5% FSCK capacity reservation requirement. Accordingly, storage management process 10 may utilize 318 at least a portion of the predefined spare rebuild portion and/or the predefined over-provision capacity for the FSCK tier based on the minimum FSCK capacity reservation requirement. In some implementations and before exiting from diagnostic mode, FSCK may return this capacity to the predefined spare rebuild portion and/or the predefined over-provision capacity and any data in the predefined spare rebuild portion and/or the predefined over-provision capacity may be unmapped.

Utilizing 314 one or more of the at least two reserved portions of the SSD for the caching tier may include utilizing 320 at least a portion of the predefined spare rebuild portion for the caching tier in response to determining that the SSD is in normal mode. For example, during normal mode, storage management process 10 may utilize 320 at least a portion of predefined spare rebuild portion 406. As discussed above, storage management process 10 may utilize 320 at least a portion of predefined spare rebuild portion 406 to cache data from one or more HDDs for more efficient IO processing using SSD 102. In this manner, storage management process 10 may provide caching capability to SSD 102 without reducing the amount of user data that may be stored in SSD 102.

Utilizing 314 one or more of the at least two reserved portions of the SSD for the caching tier may include one or more of: utilizing 320 at least a portion of the predefined over-provision portion for the caching tier in response to determining that the SSD is in degraded mode. For example, storage management process 10 may utilize 322 (e.g., share) at least a portion of the predefined over-provision portion (e.g., predefined over-provision portion 404) for the caching tier in response to determining that the SSD is in degraded mode. Continuing with the above example, suppose that after a drive failure, the SSD or storage system 12 enters degraded mode. In this example, at least a part of the predefined over-provision space (e.g., predefined over-provision portion 404) will be activated to replenish the predefined spare rebuild space (e.g., predefined spare rebuild portion 406) as predefined spare rebuild portion 406 may be utilized by storage system 12 to rebuild the failed SSD. By activating predefined over-provision portion 404 to replenish predefined spare rebuild portion 406, data in the caching tier does not have to be swapped out. In some implementations and after the failed drive is replaced, some data may be restriped from the existing drives to the new drives. The reclaimed capacity on those existing SSDs may be returned to predefined over-provision portion 404.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
defining one or more user data portions and at least two reserved portions of a solid-state drive (SSD), wherein the at least two reserved portions of the SSD include a predefined over-provision portion and a predefined spare rebuild portion;
determining an operating mode of the SSD, wherein determining an operating mode of the SSD includes one or more of:
determining that the SSD is in normal mode;
determining that the SSD is in degraded mode; and
determining that the SSD is in recovery mode; and
utilizing one or more of the at least two reserved portions of the SSD based upon, at least in part, the operating mode of the SSD, wherein utilizing one or more of the at least two reserved portions of the SSD based upon, at least in part, the operating mode of the SSD includes one or more of:
utilizing one or more of the at least two reserved portions of the SSD for a file system consistency check (FSCK) tier; and
utilizing one or more of the at least two reserved portions of the SSD for a caching tier.

2. The computer-implemented method of claim 1, wherein utilizing one or more of the at least two reserved portions of the SSD for the FSCK tier includes one or more of:
utilizing at least a portion of the predefined over-provision portion for the FSCK tier in response to determining that the SSD is in recovery mode; and
utilizing at least a portion of the predefined spare rebuild portion for the FSCK tier in response to determining that the SSD is in recovery mode.

3. The computer-implemented method of claim 1, wherein utilizing one or more of the at least two reserved portions of the SSD for the caching tier includes:
utilizing at least a portion of the predefined spare rebuild portion for the caching tier in response to determining that the SSD is in normal mode.

4. The computer-implemented method of claim 1, wherein utilizing one or more of the at least two reserved portions of the SSD for the caching tier includes:
utilizing at least a portion of the predefined over-provision portion for the caching tier in response to determining that the SSD is in degraded mode.

5. A computer program product residing on a non-transitory computer readable medium having a plurality of instructions stored thereon which, when executed by a processor, cause the processor to perform operations comprising:
defining one or more user data portions and at least two reserved portions of a solid-state drive (SSD), wherein the at least two reserved portions of the SSD include a predefined over-provision portion and a predefined spare rebuild portion;
determining an operating mode of the SSD, wherein determining an operating mode of the SSD includes one or more of:
determining that the SSD is in normal mode;
determining that the SSD is in degraded mode; and
determining that the SSD is in recovery mode; and
utilizing one or more of the at least two reserved portions of the SSD based upon, at least in part, the operating mode of the SSD, wherein utilizing one or more of the at least two reserved portions of the SSD based upon, at least in part, the operating mode of the SSD includes one or more of:
utilizing one or more of the at least two reserved portions of the SSD for a file system consistency check (FSCK) tier; and
utilizing one or more of the at least two reserved portions of the SSD for a caching tier.

6. The computer program product of claim 5, wherein utilizing one or more of the at least two reserved portions of the SSD for the FSCK tier includes one or more of:
utilizing at least a portion of the predefined over-provision portion for the FSCK tier in response to determining that the SSD is in recovery mode; and
utilizing at least a portion of the predefined spare rebuild portion for the FSCK tier in response to determining that the SSD is in recovery mode.

7. The computer program product of claim 5, wherein utilizing one or more of the at least two reserved portions of the SSD for the caching tier includes:
utilizing at least a portion of the predefined spare rebuild portion for the caching tier in response to determining that the SSD is in normal mode.

8. The computer program product of claim 5, wherein utilizing one or more of the at least two reserved portions of the SSD for the caching tier includes:
utilizing at least a portion of the predefined over-provision portion for the caching tier in response to determining that the SSD is in degraded mode.

9. A computing system comprising:
a memory; and
a processor configured to define one or more user data portions and at least two reserved portions of a solid-state drive (SSD), wherein the at least two reserved portions of the SSD include a predefined over-provision portion and a predefined spare rebuild portion, wherein the processor is further configured to determine an operating mode of the SSD, wherein determining an operating mode of the SSD includes one or more of: determining that the SSD is in normal mode, determining that the SSD is in degraded mode, and determining that the SSD is in recovery mode, and wherein the processor is further configured to utilize one or more of the at least two reserved portions of the SSD based upon, at least in part, the operating mode of the SSD, wherein utilizing one or more of the at least two reserved portions of the SSD based upon, at least in part, the operating mode of the SSD includes one or more of: utilizing one or more of the at least two reserved portions of the SSD for a file system consistency check (FSCK) tier, and utilizing one or more of the at least two reserved portions of the SSD for a caching tier.

10. The computing system of claim 9, wherein utilizing one or more of the at least two reserved portions of the SSD for the FSCK tier includes one or more of:
utilizing at least a portion of the predefined over-provision portion for the FSCK tier in response to determining that the SSD is in recovery mode; and
utilizing at least a portion of the predefined spare rebuild portion for the FSCK tier in response to determining that the SSD is in recovery mode.

11. The computing system of claim 9, wherein utilizing one or more of the at least two reserved portions of the SSD for the caching tier includes one or more of:
utilizing at least a portion of the predefined spare rebuild portion for the caching tier in response to determining that the SSD is in normal mode; and
utilizing at least a portion of the predefined over-provision portion for the caching tier in response to determining that the SSD is in degraded mode.

\* \* \* \* \*